Patented Aug. 17, 1937

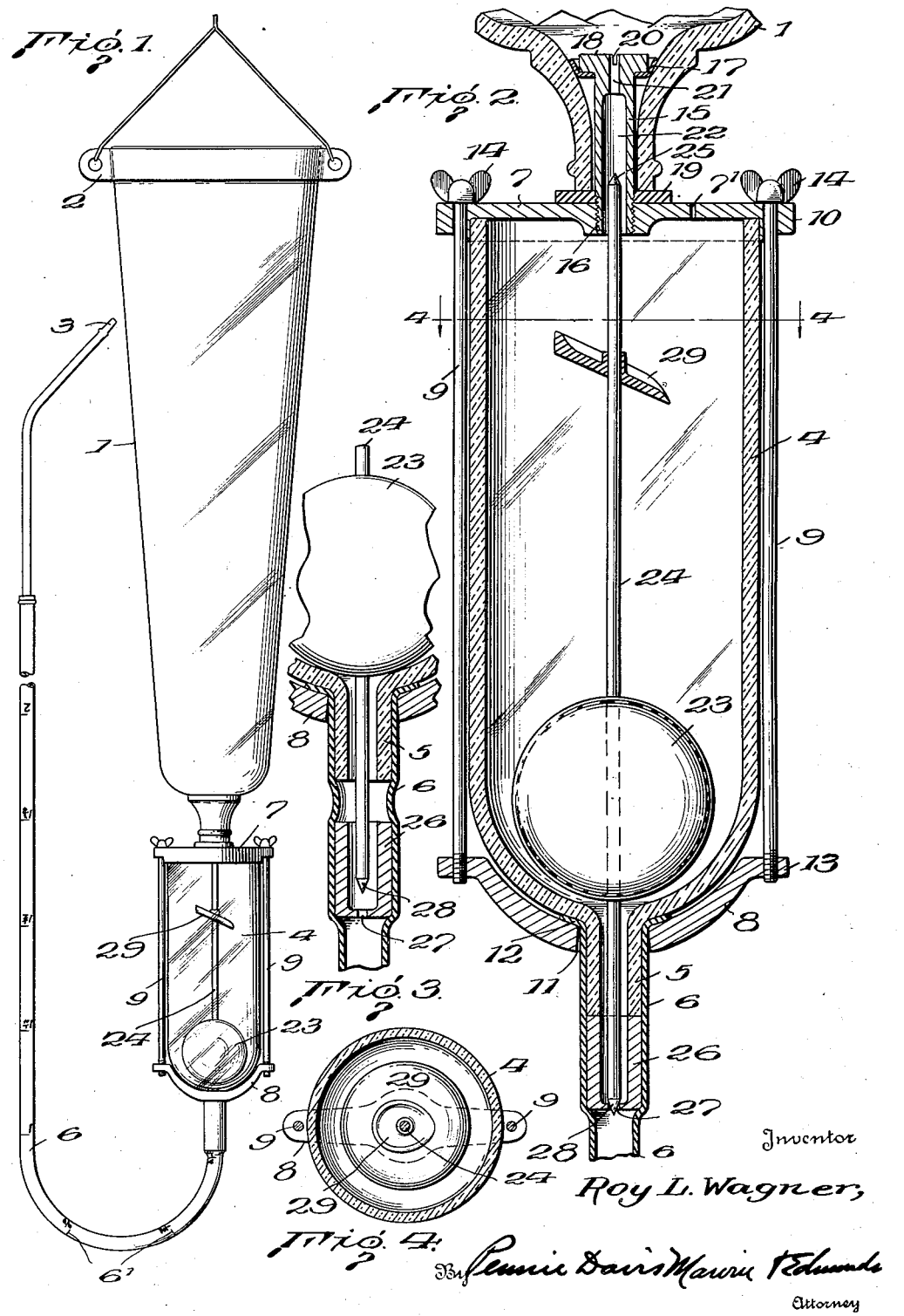

2,090,273

UNITED STATES PATENT OFFICE 2,090,273

EMBALMING DEVICE

Roy L. Wagner, Ironton, Ohio

Application October 20, 1933, Serial No. 694,479

6 Claims. (Cl. 137—68)

The present invention relates to a device for holding and dispensing a liquid under predetermined conditions and particularly to a device for holding and dispensing embalming liquids which are to be injected by gravity. However, the device of this invention is not limited to such use as it may be used in connection with syringes, and in hospitals, laboratories, and similar places where a regular, constant, and slow flow of a liquid is desired, and when it is desired that the rate of flow shall at all times be visually indicated to the operator.

Receptacles which have heretofore been used for holding embalming liquids that are to be dispensed by gravity have not been entirely satisfactory in that no provision was made for obtaining a constant flow of the liquid regardless of the amount of liquid in the receptacle. Due to the change in the hydrostatic head the flow would be greater at the beginning of the injection than at the end. Also such receptacles had no means whereby the operator could at all times see at what rate the liquid was being injected and consequently immediately be apprised of a stoppage of the flow of the liquid due to an obstruction in the body. Furthermore, in such receptacles, no means were provided for preventing air from entering the body after the last of the liquid was injected with the result that tissue gas frequently formed in the body.

The present invention overcomes the objections to embalming devices that have heretofore been used by providing a main transparent liquid-holding receptacle and by providing between that receptacle and the injection needle means for regulating and visually indicating to the operator the rate at which the liquid is being injected into the body.

The regulating and indicating means preferably comprises a transparent chamber for receiving the liquid from the main receptacle which acts as a reservoir for the liquid to be injected. This chamber contains float actuated valves which control the admission and discharge of the liquid to and from the chamber. That valve is so controlled that a predetermined amount of the liquid will be maintained in the dispensing chamber as long as liquid remains in the reservoir chamber. The outlet valve is maintained open as long as a predetermined amount of liquid remains in the chamber, but in normal operation closes before all of the liquid is dispensed from the chamber so that the tube leading therefrom to the injection needle will remain filled with the liquid and air cannot pass therethrough and into the body. However, means are provided whereby the operator may, if he so desires, cause the last of the liquid to flow from the dispensing chamber.

As the liquid flows from the main reservoir receptacle into the dispensing chamber it is deflected to one side so that the operator may see at what rate the liquid is flowing into the dispensing chamber and consequently the rate at which it is being injected into the body. Of course, if the flow from the dispensing chamber to the body ceases, liquid no longer flows into the dispensing chamber and that fact immediately is made apparent to the operator.

Advantages other than those enumerated above will appear from the following description taken in connection with the accompanying drawing, but it is to be understood that this further disclosure and description is by way of exemplification and that the invention is not limited thereto except as is specifically pointed out in the appended claims.

In the drawing,

Fig. 1 is a side elevation of an embodiment of the invention;

Fig. 2 is an enlarged vertical sectional view through the dispensing chamber and the lower portion of the main reservoir receptacle;

Fig. 3 is an enlarged sectional view through the outlet valve of the dispensing chamber showing the same open for draining the chamber; and Fig. 4 is a sectional view taken on line 4—4 of Fig. 2.

In the drawing 1 is a generally cone-shaped, transparent or glass liquid holding receptacle provided with handles 2 formed on opposite sides, adjacent the upper edge, whereby the receptacle may be suspended from a ceiling or other support. The formation of the handles integrally with the body eliminates the necessity of attaching a metal band such as is ordinarily used for suspending such receptacle and which obstructs the view to the upper part of the receptacle. If desired, the glass receptacle 1 may be suitably graduated so that the operator may note the exact amount of the liquid remaining in the receptacle or the amount which has already been dispensed therefrom.

The receptacle 1 diverges upwardly and the entire upper end is left open so that it will be easy to introduce the liquid to be dispensed.

Located between the reservoir receptacle 1 and the injection needle 3 is a dispensing chamber. The receptacle 1 and the dispensing chamber may be directly connected, as shown, or, if desired, the dispensing chamber may be located at a distance from the receptacle 1 and connected thereto by a suitable conduit. As shown, the dispensing chamber comprises a glass or other transparent vessel 4 which has an open top and a hemispherically shaped bottom terminating in a discharge nipple 5 over which a rubber tubing 6 leading to the injection needle 3 is passed.

The glass vessel 4 is rigidly held in the metal frame consisting of a top member 7, a bottom member 8, and tie rods 9 located on diametrically opposite sides of the vessel. The top member 7 forms a closure for the open upper end of the vessel 4 and has its edge 10 flanged to extend beyond and around the upper side of the vessel. A suitable vent 7' is provided so that a uniform flow of liquid from the vessel may be obtained. The bottom member 8 is shaped to conform to the hemispherical bottom of the vessel 4 and is provided with an opening 11 through which the nipple 5 and the rubber tube 6 pass. The end of the rubber tube is flared as at 12 to provide suitable packing between the vessel 4 and the bottom member 8. The bottom member 8, like the top member 7, has a flange 13 which extends outwardly beyond the vessel 4. The flanges 10 and 13 have aligned openings for the tie rods 9. The openings in the flange 10 are slightly larger than the rods 9 so that the rods may freely pass therethrough while the openings in the flange 13 are threaded to receive the threaded lower ends of the rods 8. The upper ends of the rods 9 are provided with wings 14 so that the rods may readily be turned with the fingers to screw their lower ends into the threaded openings of the lower member 8 to rigidly connect the upper and lower members to the vessel 4.

When the dispensing chamber is connected directly to the receptacle 1 a connecting member 15 having a threaded lower end is inserted in the tapering neck at the lower end of the receptacle 1 and the threaded end screwed into a threaded central opening 16 in the top member 7 until the receptacle is rigidly secured to the top member. A resilient washer 17 may be interposed between the head 18 of the member 15 and the neck of the receptacle 1 to prevent breakage of the latter, and a packing washer 19 is preferably placed between the neck of the receptacle 1 and the top member 7 of the dispensing chamber to insure a liquid-tight connection at that point. The head 18 of the connecting member 15 is kerfed at 20 to facilitate screwing the member into the top member 7.

Liquid passes from the receptacle 1 to the dispensing chamber through the connecting member 15, and to that end the connecting member is provided with a relatively small bore 21 at its upper end and a relatively large bore 22 extending from the bore 21 to the lower end of the member.

For controlling the flow of liquid from the receptacle 1 to the dispensing chamber, and from the dispensing chamber to the injecting needle 3, a hollow metal float 23 is located within the vessel 4 and is fixedly secured on a valve rod 24 which has its upper end extending into the bore 22 of the connecting member 15 at the upper end of the chamber and its lower end extending through the nipple 5 at the bottom of the vessel. The diameter of the valve rod is considerably less than the diameter of the bore 22 of the member 15 and the inner diameter of the nipple 5 so that ample space is provided for the liquid to flow about the rod through the bore 22 and the nipple 5. However, the diameter of the rod is greater than that of the bore 21 of the member 15. The upper end of the rod 24 is provided with a conical valve 25 so that when a predetermined amount of liquid has flowed from the receptacle 1 into the vessel 4 and has caused the float 23 therein to rise, the valve 25 will seat against the end of the bore 21 and prevent further flow of the liquid into the vessel 4 until some of the liquid therein flows out through the nipple 5.

Positioned within the rubber tube 6 adjacent the lower end of the nipple 5 is a cylindrical valve member 26 which has the lower end thereof closed except for a central opening 27 through which liquid from the vessel 4 may flow to the injection needle. The lower end of the valve rod 24 is provided with a conical valve 28 which, when the float 23 descends, is caused to seat on the edges of the opening 27 and prevent further discharge of the liquid from the vessel 4. The float 23 will be so made that the valve 28 will be caused to seat on the edges of the opening 27 just before all of the liquid flows from the vessel 4 so that the tube 6 will remain filled with the liquid in order to prevent air from passing through the tube into the body where it would form tissue gas. However, if the operator desires to drain the vessel 4 it is only necessary that he grasp the valve member 26 with his fingers and pull it down to the position shown in Fig. 3. When the valve member 26 is lowered to that extent, the float 23 will rest on the bottom of the glass vessel 4 and the valve 28 will be suspended above the opening 27 so that the last of the liquid in the vessel 4 may flow therefrom. As soon as all of the liquid has been drained from the vessel 4 and the tube 6 it is only necessary that the operator release the member 26 when, due to the resiliency of the rubber tube, it will be returned to the position shown in Fig. 2.

In Fig. 2 the vessel is shown as being empty and with the valve 28 resting on the edges of the opening 27. If liquid is now poured into the vessel 4 it will flow through the bores 21 and 22 and down around the valve rod 24 until it encounters the deflector 29. It will then run along the surface of the deflector and drip from the lower edge thereof into the bottom of the vessel 4. When a predetermined amount of the liquid has run into the vessel 4 the float 23 will rise and open the valve 27. On continued upward movement of the float the valve 25 will engage the edges of the bore 21 to stop further flow from the receptacle 1. Thereafter, the amount of liquid flowing from the receptacle 1 will be in accordance with the amount being injected into the body, and as the flow will be deflected by and dropped from the disc 29, the operator may readily see at what rate the liquid is being injected, or if the flow through the needle stops due to an obstruction in the body that fact can also be noted by the operator. After all of the liquid has flowed from the receptacle 1 into the vessel 4, further discharge from the vessel 4 will gradually cause the float 23 to be lowered until the valve 28 engages the edges of the opening 27 and stops further discharge from the vessel 4. Thereafter if it is desired to drain the vessel 4 the operator need only grasp the valve member 26 and lower it in the manner previously described.

The rubber tubing 6 is graduated as shown at 6' so that the operator may determine at just what pressure the embalming liquid is being injected. That is desirable as the pressure at the injection nozzle should vary depending upon the cause of death, size of body, condition of body, and other conditions which the undertaker has to contend with. As the float 23 maintains a constant hydraulic head on the liquid in the tube 6 to get any desired pressure at the injection nozzle it is only necessary to raise or lower the reservoir receptacle 1. The graduations 6' read downwardly from the vessel 4 so in order to read the pressure existing at the injection nozzle it is only necessary to hold the receptacle 1 directly over the point of injection and read down the tube to a point level with the injection point.

From the aforegoing, it will be apparent that the present invention provides a satisfactory and efficient means for dispensing a liquid under a regular and constant flow, and where it is desirable that the rate at which the liquid is dispensed shall at all times be visually indicated to the operator. Furthermore, the present invention provides a device which is particularly adapted for dispensing an embalming liquid by gravity and for cutting off the flow of that liquid before the supply is entirely exhausted whereby air is prevented from entering the body where it would form tissue gas.

I claim:—

1. A device for injecting liquids by gravity which comprises a reservoir receptacle, a dispensing chamber located beneath said reservoir receptacle and in communication therewith, said dispensing chamber having at least a portion of the wall thereof transparent, a vertically operating valve for closing the passage between the reservoir receptacle and the dispensing chamber, and a deflector on the valve stem for causing liquid flowing therealong to be deflected therefrom in a single stream and to cause the rate at which liquid is flowing into said dispensing chamber to be visually indicated.

2. In a device of the character described, a dispensing chamber having a discharge outlet, a rubber tube having one end thereof secured to the dispensing chamber for conducting away liquid which passes through said outlet, a valve seat in said tube, a valve cooperating with said seat and operable to seat thereon when liquid in the dispensing chamber reaches a predetermined low level, said rubber tubing permitting the valve seat to be moved away from said valve a sufficient distance after the valve has seated thereon to permit the dispensing chamber to be drained.

3. In a device of the character described, a reservoir receptacle, a dispensing chamber in communication therewith and having a discharge outlet including a valve seat, means for regulating the flow of liquid from the reservoir receptacle to the dispensing chamber in accordance with the rate at which liquid is dispensed from said chamber, a valve cooperating with said seat and operable to close the outlet when liquid in the dispensing chamber reaches a predetermined low level, and means whereby said seat and valve may thereafter and independently of the liquid level in the discharge chamber be separated a distance sufficient to permit the dispensing chamber to be drained.

4. In a device of the character described, a reservoir receptacle, a dispensing chamber in communication therewith and having a discharge outlet including a valve seat, means for regulating the flow of liquid from the reservoir receptacle to the dispensing chamber in accordance with the rate at which liquid is dispensed from said chamber, a valve cooperating with said seat and operable to close the outlet when liquid in the dispensing chamber reaches a predetermined low level, and means whereby said seat may be moved away from said valve a distance sufficient to permit the dispensing chamber to be drained.

5. In a device of the character described, a reservoir receptacle, a dispensing chamber in communication therewith having a discharge outlet, means for regulating the flow of liquid from the reservoir receptacle to the dispensing chamber in accordance with the rate at which liquid flows from said chamber, a rubber tube having one end thereof secured to the dispensing chamber for conducting away liquid which passes through said outlet, a valve seat in said tube, a valve cooperating with said seat and operable to close the outlet when liquid in the dispensing chamber reaches a predetermined low level, said rubber tube permitting the valve seat to thereafter be moved from said valve a distance sufficient to permit the dispensing chamber to be drained.

6. In a device of the character described, a reservoir receptacle, a dispensing chamber in communication therewith and having a discharge outlet, a float controlled valve for regulating the flow of liquid to said dispensing chamber, a rubber tube having one end thereof secured to the dispensing chamber for conducting away liquid which passes through the outlet therefrom, a valve seat in said tube, a float controlled valve cooperating with said seat and operable to seat thereon when the liquid in the dispensing chamber reaches a predetermined low level, said rubber tubing permitting the valve seat thereafter to be moved from said valve a distance sufficient to permit the draining of the dispensing chamber.

ROY L. WAGNER.